W. D. HAINES.
FEED REGULATING DEVICE FOR SEED PLANTING MACHINES.
APPLICATION FILED AUG. 8, 1910.
989,348.
Patented Apr. 11, 1911.
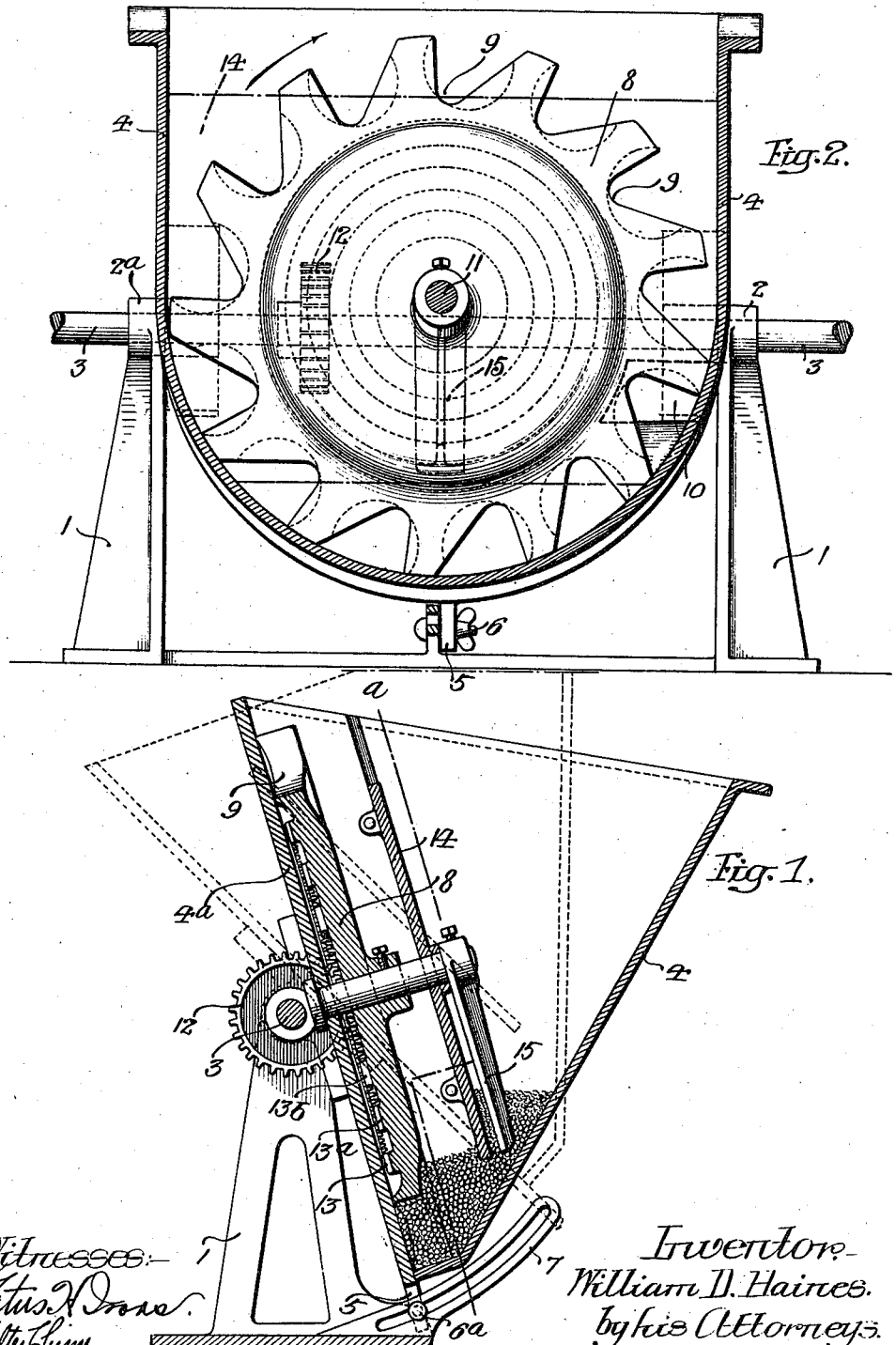

UNITED STATES PATENT OFFICE.

WILLIAM D. HAINES, OF HADDONFIELD, NEW JERSEY.

FEED-REGULATING DEVICE FOR SEED-PLANTING MACHINES.

989,348.  Specification of Letters Patent.  Patented Apr. 11, 1911.

Application filed August 8, 1910. Serial No. 576,102.

*To all whom it may concern:*

Be it known that I, WILLIAM D. HAINES, a citizen of the United States, residing in Haddonfield, Camden county, New Jersey, have invented certain Improvements in Feed-Regulating Devices for Seed-Planting Machines, of which the following is a specification.

One object of my invention is to provide a simple, substantial and conveniently adjustable device for regulating the feed of any form of granular or lump material, such as seeds of various sizes.

More particularly it is desired to provide a feed regulating device especially adapted for use on seed planting machines whereby it shall be possible to vary the number of seeds periodically discharged by the machine, as may be desired.

These objects and other advantageous ends I secure as hereinafter set forth, reference being had to the accompanying drawings, in which;—

Figure 1, is a central vertical section taken through the stirrer shaft illustrating one form of my feed regulating device, and Fig. 2, is a vertical section on the line *a—a*, Fig. 1.

In the above drawings, 1 represents a supporting structure which may be attached to a machine such as a seed planter and this is provided with bearings 2 and 2ª for the reception of a shaft 3 driven from any suitable source of power.

Loosely mounted on this shaft 3 is a receiving hopper 4 having a projection 5 at its lower edge for the reception of a clamp 6; this latter being designed to operate in a slot formed in a curved arm 7 to permit the hopper 4 to be swung on its supporting shaft 3 within certain predetermined limits. A feed wheel 8 is mounted within the hopper adjacent a plane side thereof, indicated at 4ª, and is preferably formed with a number of peripheral recesses 9, preferably undercut. In this plane side 4ª adjacent one edge thereof, is a discharge opening 10 into which the material carried by the recesses of the feed wheel falls as these latter are brought over the same. Said wheel is fixed to a spindle 11 journaled in the hopper structure, being turned at any of a number of different speeds by means of a gear wheel 12 fixed to the shaft 3 and so designed as to be capable of meshing with any of a number of circular racks 13, 13ª, and 13ᵇ formed in or mounted on the feed wheel. A transverse partition 14 extends across the interior of the hopper 4 substantially parallel with and adjacent to the feed wheel 8;—its design being such that there is a relatively small opening between its lower edge and the lower side parts of the hopper, through which material passes to reach the lowermost portion of said hopper and the feed wheel. The spindle 11 extends through this partition and on its end carries a stirring arm 15 designed to facilitate the flow of seed or other material through the opening under the partition 14.

Under operating conditions the seed or other granular or lump material to be delivered in measured quantities or numbers, is placed within the hopper in front of the partition 14, and some of it flows under the lower edge of this partition into the lowermost of the peripheral recesses of the feed wheel. As this latter is turned, its teeth with their recesses wholly or partially full, as the case may be, pass upwardly, across the top of the hopper, and down the opposite side thereof until such recesses come over the opening 10, when their contents are successively discharged under the action of gravity into any desired conduit or receptacle. It is obvious that if the hopper be held by means of the clamping screw 6 so that the side 4ª with the feed wheel 8 is in or adjacent to a vertical plane, but comparatively small charges of granular material can enter the recesses between the teeth so that these are but partially filled; it being possible to accurately adjust the position of the hopper so as to regulate to the utmost nicety the actual number of seeds or bodies entering each recess. As the hopper is swung on the shaft 3 into or toward the position shown in dotted lines in Fig. 1, a greater relative amount of material passes through the opening under the lower edge of the partition 14, with the result that a greater number of seeds or particles enters each of the recesses of the feed wheel and is delivered thereby to the opening 10; it being possible to so modify the angle of the hopper that each of the recesses may be filled. The stirring arm 15, turning with the shaft 11, effectually prevents any clogging or stoppage of flow of the material to the feed wheel, whose relative speed may be varied by sliding the gear 12 on the shaft 3 into engagement with one or the other of the toothed racks 13, 13ᵃ and 13ᵇ.

It will be understood, of course, that modifications in the character of the feed wheel may be resorted to to take care of various kinds of seeds. In some instances, the teeth may have wider spaces; in other instances the spaces may be narrower, and in still other instances apertures adjacent the margin of this wheel may be employed in lieu of such teeth; such apertures and the spaces between the teeth being in all instances of a size suitable to accommodate the seed desired to be sown.

I claim:—

1. The combination in a feed regulating device of a container; a feed wheel for periodically discharging measured quantities of material therefrom; said feed wheel being adjustable on an axis substantially parallel to its plane to vary the amount of material delivered.

2. The combination of a supporting structure; a container mounted thereon capable of being turned to adjust its position; with a feed wheel in the container adjustable therewith on an axis substantially parallel to its plane to vary the amount of material discharged by it.

3. The combination of a container; a feed wheel therein; means for turning said feed wheel to discharge material from the container; with means for adjustably supporting the container so as to permit of a variation of the angle of the feed wheel to a vertical plane.

4. The combination of a supporting structure; with a feed wheel mounted on said structure, having recesses for conveying granular material and free to be adjusted as to its angle to a vertical plane to vary the amount of material entering said recesses.

5. The combination of a supporting structure; with a feed wheel mounted on said structure, having recesses for conveying granular material and free to be adjusted as to its angle to a vertical plane to vary the amount of material entering said recesses; with an agitator connected to the feed wheel.

6. The combination of a supporting structure; a feed wheel capable of adjustment to vary its angle to the vertical; a container for material; and a structure for limiting the amount of material passing to said feed wheel.

7. The combination of a supporting structure; a container mounted thereon and capable of being turned to adjust its position; a feed wheel in said container having recesses and adjustable with the container to vary its angle to the vertical; with a partition in the container for limiting the amount of material passing to said feed wheel.

8. The combination of a supporting structure having a shaft; a container mounted to be capable of oscillation to adjust its position and having means for retaining it in any adjusted position; and a feed wheel adjustable with the container to vary its angle to a vertical plane and having means for connecting it to said shaft.

9. The combination of a supporting structure having a shaft; a container loosely mounted on said shaft so as to be free to turn for purposes of adjustment and having an opening in one of its sides; a spindle in the container operatively connected to said shaft; a feed wheel having recesses and mounted on said spindle so as to rotate adjacent the opening; said wheel being adjustable with the container to vary its angle to the vertical; with a partition in the container for limiting the amount of material passing to the recesses of the feed wheel.

10. The combination of a supporting structure having a shaft; a container loosely mounted on said shaft so as to be free to turn for purposes of adjustment and having an opening in one of its sides; a spindle in the container operatively connected to said shaft; a feed wheel having recesses and mounted on said spindle so as to rotate adjacent the opening; with a partition in the container for limiting the amount of material passing to the recesses of the feed wheel; and a stirring arm on said spindle.

In testimony whereof, I have signed my name to this specification, in the presence of two subscribing witnesses.

WILLIAM D. HAINES.

Witnesses:
 MURRAY C. BOYER,
 WM. BROWN, Jr.